United States Patent [19]

Nakajima et al.

[11] Patent Number: 4,869,582

[45] Date of Patent: Sep. 26, 1989

[54] OPTICAL SCANNING APPARATUS FOR PREVENTING THE DISLOCATION OF A STATIONARY MIRROR

[75] Inventors: Tomohiro Nakajima, Matsudo; Takeshi Komurasaki, Yokohama, both of Japan

[73] Assignee: Ricoh Company, Ltd., Tokyo, Japan

[21] Appl. No.: 131,943

[22] Filed: Dec. 11, 1987

[30] Foreign Application Priority Data

Dec. 23, 1986 [JP] Japan .................................. 61-305444

[51] Int. Cl.$^4$ ................................................. G02B 7/18
[52] U.S. Cl. .................................... 350/631; 248/473; 350/6.8
[58] Field of Search ..................... 248/473, 477, 496; 350/252, 631, 637, 6.7, 6.8

[56] References Cited

U.S. PATENT DOCUMENTS

| | | | |
|---|---|---|---|
| 3,918,799 | 11/1975 | Kurz, Jr. et al. | 350/631 |
| 4,319,836 | 3/1982 | Murata et al. | 350/252 |
| 4,614,403 | 9/1986 | Kersten et al. | 350/252 |
| 4,648,693 | 3/1987 | Losch | 350/637 |
| 4,662,717 | 5/1987 | Yamada et al. | 350/252 |
| 4,668,047 | 5/1987 | Okura | 350/252 |

FOREIGN PATENT DOCUMENTS 58-46317  3/1983  Japan .

Primary Examiner—Bruce Y. Arnold
Assistant Examiner—Martin Lerner
Attorney, Agent, or Firm—Cooper & Dunham

[57] ABSTRACT

An optical apparatus in which optical devices are abutted against reference planes for positioning secured in the housing case of an optical system, and the housing cover is put on said housing case. On the inside surface of the housing cover a rib is provided to restrict the movement of the optical devices with the cover securely put on the housing case.

1 Claim, 5 Drawing Sheets

OPTICAL SCANNING APPARATUS FOR PREVENTING THE DISLOCATION OF A STATIONARY MIRROR

FIELD OF THE INVENTION AND RELATED ART STATEMENT

This invention relates to an optical apparatus having a dislocation prevention device to prevent such optical devices as an optical mirror etc. incorporated in the housing case from working loose out of the given position due to shock and so on.

The writing device of the laser printer, laser facsimile, laser copying machine or other image forming apparatus which writes an image on the photosensitive member by the laser beam, as illustrated in FIGS. 3 to 5, irradiates the laser beam modulated by image information emitted from a laser diode (LD) unit 1 on the surfaces of the polygon mirror 5 rotating at a constant high speed by way of the first cylindrical lens 2, the first mirror 3, and the spherical lens 4. On each moving surface of the polygon mirror 5, the incident laser beam is repetitively deflected a constant angle by each surface of the polygon mirror, and is further reflected vertically to reach the photosensitive drum 8 through the second cylindrical lens 7. In this instance, the laser beam scans (main scanning) the second mirror 6, and therefore, the drum 8 in the generatrix direction as indicated by an arrow B. Since the drum 8 is rotated at a constant speed, subscanning is made, so that an image is written on the photosensitive member. In this connection, as means for generating a synchronizing signal to define the writing start position of an image for each main scanning, as shown by broken lines in FIGS. 3 and 4, a laser beam which advances toward the predetermined leading edge of the image writing range within the deflection range generated by the rotating polygon mirror 5, is selected as the synchronizing beam and is incident to an optical fiber 11 by way of a third mirror 9 and a third cylindrical lens 10. The laser beam is further incident to a photo diode by way of the optical fiber 11 to generate a synchronizing signal for writing start.

The optical devices forming the path through which the laser beam emitting from said laser diode (LD) unit 1 is incident to the second mirror 6 and the third cylindrical lens 10, as shown in FIGS. 4 and 5, are disposed in the housing 12 to prevent unnecessary light from entering and to prevent their contamination from toner and dust. After the optical devices are placed in position in the housing 12, a housing cover 13 (FIG. 5) is closed on the housing 12. FIG. 4 shows the optical system with the cover 13 removed.

In general, to place the optical devices of said optical system in position, as shown in FIGS. 6A and 6B, adopted is the method in which the reference plane 16 of an optical device 15 (i.e. a mirror surface) is abutted against the corresponding reference plane 14 secured in the housing 12 with a precise positional accuracy, and the back face is elastically pressed with a leaf spring 17. If it is necessary to adjust the position, the reference plane on the housing side is reformed by adjusting the three screws ( a plane is defined with the tips of the three adjusting screws). This method provides a high degree of precision for the positioning of mirror surfaces.

However, since dislocation of an optical device in a plane parallel to the mirror surface is restricted only with the frictional forces between the mirror surface of the device and the reference plane of the housing as well as the pressing surface of the leaf spring and the pressed surface of the device, if an impact force is applied on them in transit, the dislocation of the mirror in the left or right direction or in the upward direction (arrows in FIG. 6B) in the plane parallel to the mirror surface can occur, thus resulting in an accumulated dislocation leading to the failure of light beam propagation or the dropping and damage of the mirror.

OBJECT AND SUMMARY OF THE INVENTION

In view of the above problem in the prior art of how to secure the optical devices in the optical system, the object and purpose of this invention is to provide an optical apparatus having a device which can prevent dislocation of optical devices without impairing the mounting precision of the optical devices.

To achieve the above object, the invention comprises a rib limiting the movement of the optical devices in the surfaces parallel to the mounting reference plane(s), disposed on the inside surface of a housing cover of an optical system, when the cover is mounted on the housing case.

BRIEF DESCRIPTION OF THE DRAWINGS

In the accompanying drawings, there are shown illustrative embodiments of the invention from which these and other of its objectives, novel features and advantages will be readily apparent.

In the drawings.

DETAILED DESCRIPTION OF PREFERRED EMBODIMENT

Figure 1A:
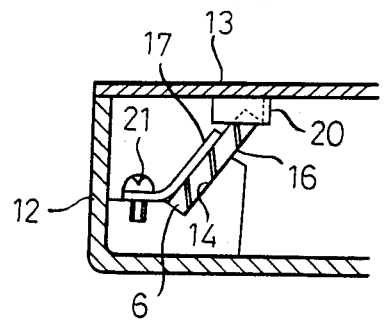
FIGS. 1A and 1B are a side view and a perspective view which show respectively embodiments according to the invention.
Figure 1B:
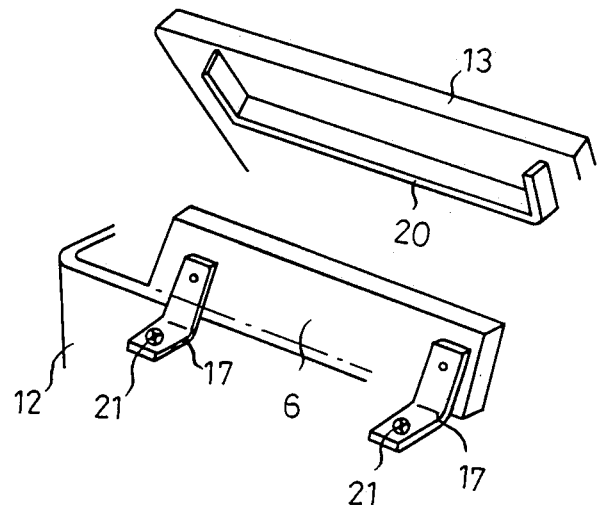

FIGS. 1A and 1B show embodiments according to the invention adapted for the second mirror (reflection mirror) in the laser writing optical system described previously.

A second mirror 6 is secured in position in the same way as the prior art of optical devices in that the surface 16 of the mirror 6 is abutted against a reference plane 14 secured on a housing case 12, and the back surface is pressed with a leaf spring 17 for securely positioning. With an optical system according to the invention, however, a rib 20 is provided on the inside face of a housing cover 13 in such a position that the rib 20 limits the left-to-right and upward movements of the second mirror 6 in the mirror plane, when the cover 13 is closed on the housing case 12 in position.

Since the device is so configured as described above, the mirror surface 16 of the mirror 6 is abutted against the reference plane 14 and positioned perpendicularly to the mirror surface in the same way as the prior art, and there is no possibility that the rib 20 removes or forces the mirror surface 16 from or to the reference plane 14 when the housing cover 13 is closed. However, since left-to-right and upward movements of the mirror in the mirror plane are restricted, if an impact force is applied in transit, the mirror will not slide in such a great distance against the frictional force between the spring 17 and the mirror 17 as well as between the reference plane 14 and the mirror as to disable the propagation of light beam and to work loose out of the mounting reference surface, thus resulting in prevention of mirror damage.

Figure 2:
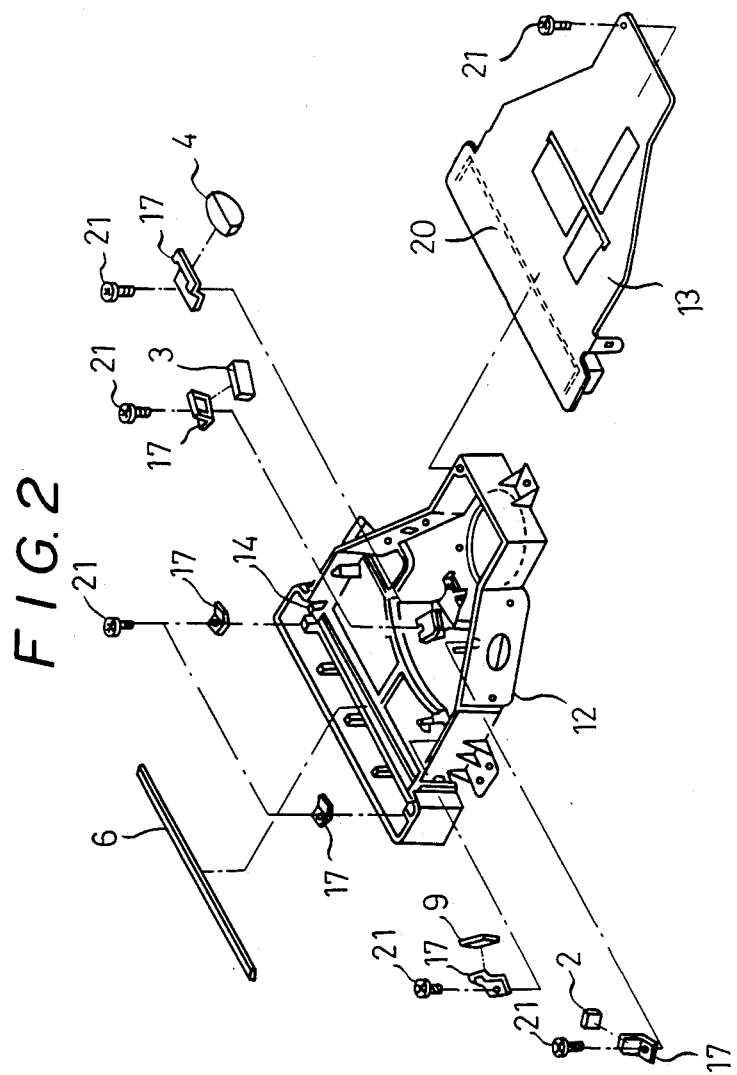
FIG. 2 is an exploded view in perspective which show how to assemble a laser writing optical system according to the invention.
Figure 3:
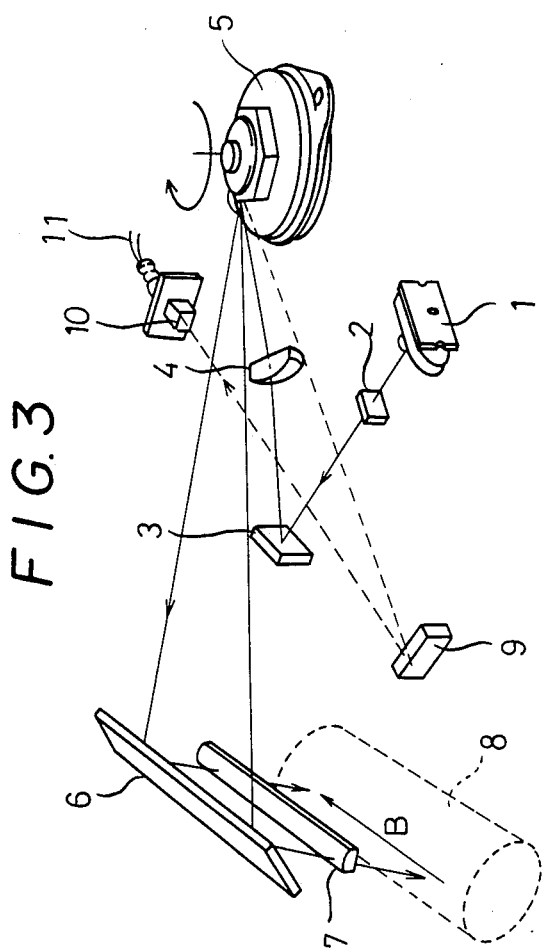
FIG. 3 is a perspective view which shows the configuration of the laser writing optical system in the prior art.
Figure 4:
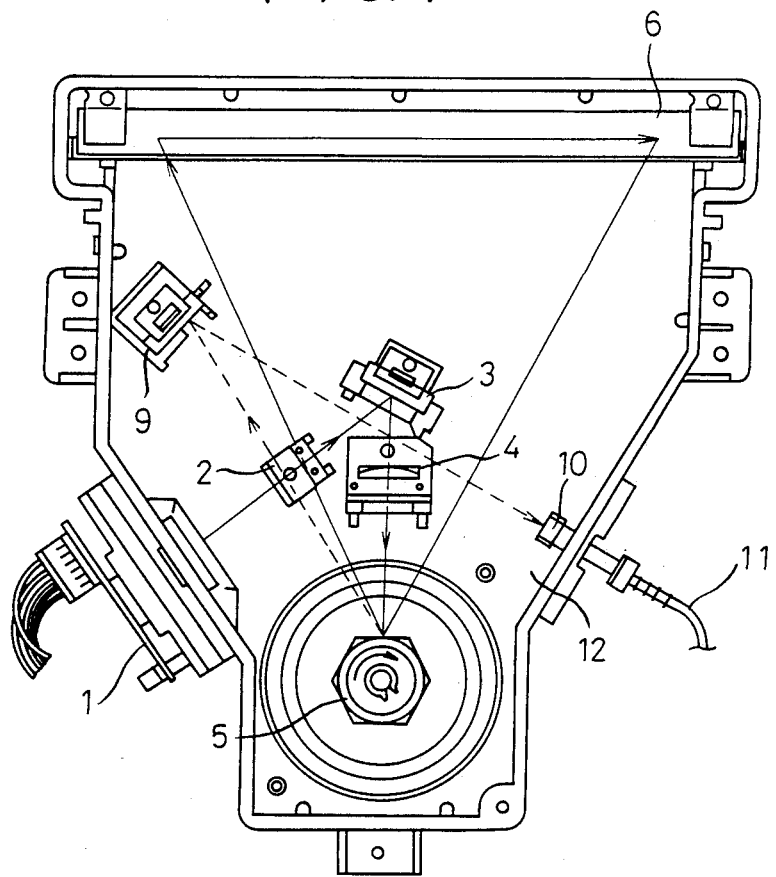
FIG. 4 is a plan view of the optical system incorporated in the housing.
Figure 5:
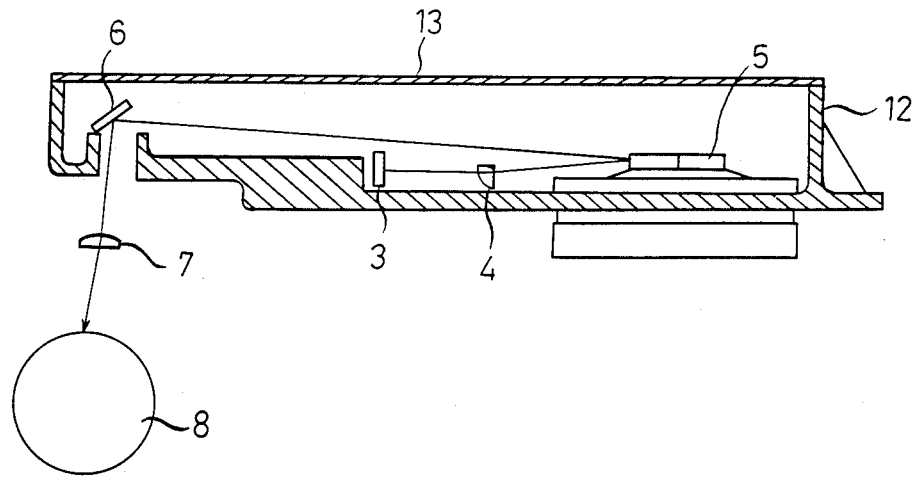
FIG. 5 is a side view of the optical system which shows the housing case and the housing cover.
Figure 6A:
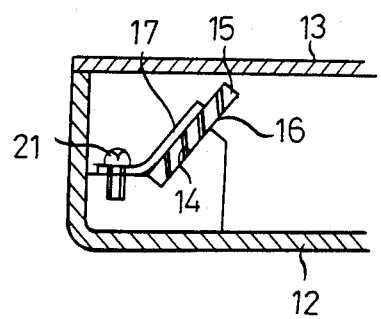
FIGS. 6A and 6B are respectively a sectional view and a perspective view of an example in the prior art of how to assemble the optical devices.
Figure 6B:
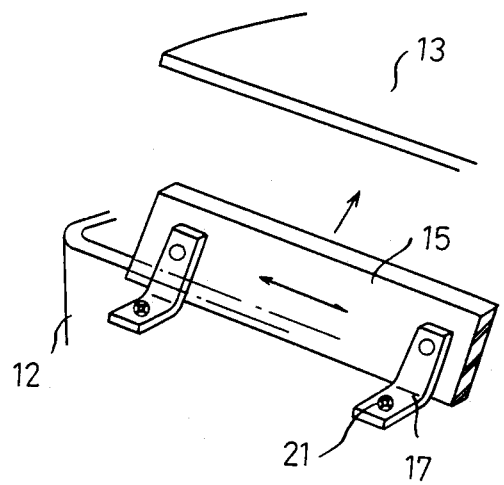

FIG. 2 illustrates how to assemble said laser writing device according to the invention. On the bottom of the housing case 12, the reference plane 14, which abutts against a first cylindrical lens 2, a first mirror 3, a spherical lens 4 and the second mirror 6 for their positioning, is secured. The plane is integrally formed with the housing and the positional relation of them is maintained very accurately. Each of said lenses and mirrors abutts against its corresponding reference plane, and the pressing member made of the leaf spring 17 is fastened with screws 21 tightened into threaded holes in the vicinity of the reference plane 14 to press each lens and mirror to the reference plane from the back side. In the embodiment, the leaf springs passing down the optical devices other than the second mirror 6 are bent upwards to prevent the optical devices from rising up, and the left-to-right movement is suppressed by protruding the left and right ends of the reference plane. The second mirror 6 is the only device in which such means for preventing the movement is not provided on the leaf spring 17 and the reference plane 14, but the rib 20 according to the invention is so provided on the housing cover 13 that the left-to-right and upward movement of the mirror 6 is prevented by installing the housing cover 13 on the housing case 12 with the screws 21.

As described above, this invention can prevent the optical devices in the optical systems from dislocating in the reference plane and working loose using this simple configuration.

What is claimed is:

1. An optical scanning apparatus comprising, in combination, an optical system including at least one mirror;

a housing case in which said optical system, including said at least one mirror, is disposed;

at least one reference plane secured in the housing case, said at least one mirror being abutted against said at least one reference plane for positioning;

means for exerting a pressing force on said at least one mirror in a given direction to press said at least one mirror against said at least one reference plane;

a housing cover, disposed on said housing case, for preventing unnecessary light from entering and for preventing contamination of the optical system from dust, said cover having an inside surface; and a rib or ribs disposed on said inside surface of said housing cover to restrict movement of said at least one mirror along a direction different from said given direction of said force.

* * * * *